Aug. 11, 1931.  H. E. BROOKBY ET AL  1,818,376
CELLULAR CONCRETE MACHINE
Filed June 16, 1927   3 Sheets-Sheet 3

Inventor:
Harry E. Brookby,
Fred J. Gough,
By Jones, Addington, Ames & Seibold
Attys Patented Aug. 11, 1931

1,818,376

UNITED STATES PATENT OFFICE

HARRY E. BROOKBY, OF EVANSTON, ILLINOIS, AND FRED J. GOUGH, OF FORT DODGE, IOWA, ASSIGNORS TO UNITED STATES GYPSUM COMPANY, OF CHICAGO, ILLINOIS, A CORPORATION OF ILLINOIS

CELLULAR CONCRETE MACHINE

Application filed June 16, 1927. Serial No. 199,149.

Our invention relates to mixing machines and more particularly to machines for producing cellular cementitious products.

One of the objects of this invention is to provide a simple, practical and efficient machine of the character described.

Another object of this invention is to provide a continuous process machine for producing a cellular concrete or similar product.

Other objects and advantages will appear and be brought out more fully in the following specification and drawings, in which Fig. 1 is a plan view of an embodiment of this invention.

Figure 1:
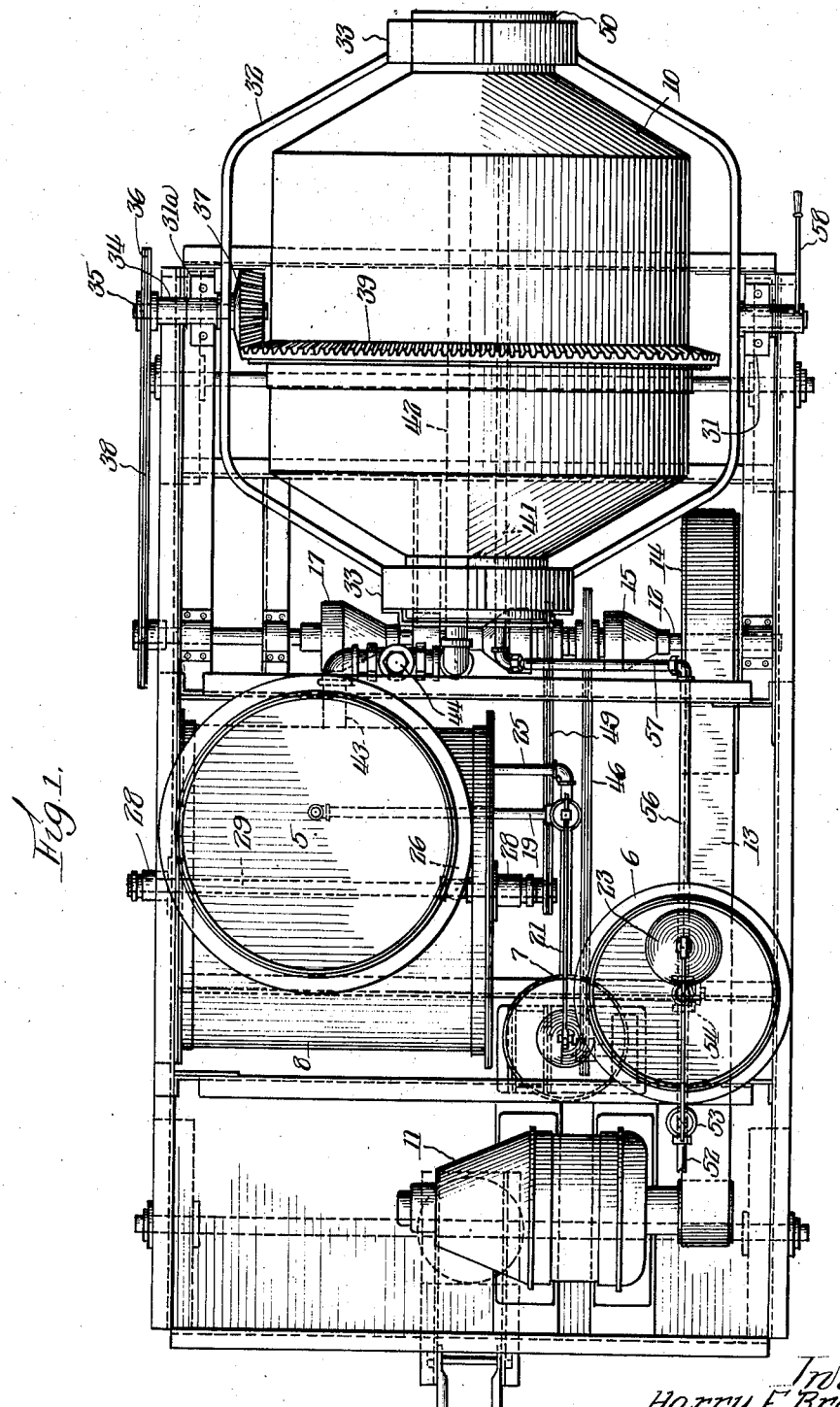
Figure 2:
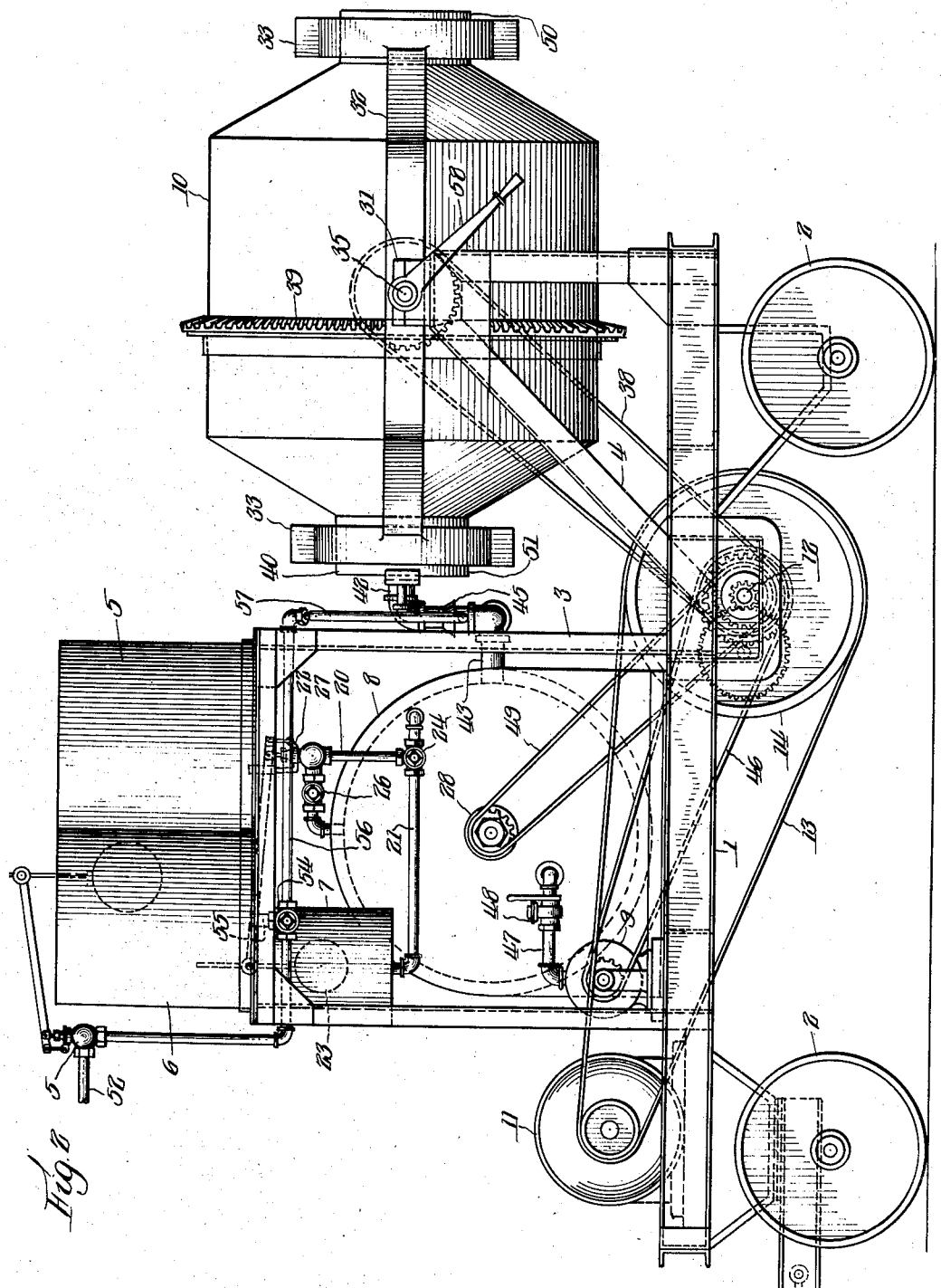
Fig. 2 is a side view of the same.

In the manufacture of plastic and cementitious building materials, it is desirable to produce a product which is light in weight, fire resistant, and structurally strong. Such a material can be produced by the herein described invention, by the novel method of forming voids in the plastic or cementitious material. This is advantageously accomplished by first producing a foam from a suitable foaming liquid by whipping or beating and then mixing the foam with the structural material while in the plastic stage.

In this invention the salient features comprise a foam liquid storage tank, a water storage tank, gauging tanks for the same, a foam whipper, a mixing chamber, means for discharging the foam from the whipper to the mixer and suitable driving means for the operating parts.

Referring more particularly to the drawings, a frame 1 is provided with any suitable mounting means, such as wheels 2, and supports an auxiliary frame 3 and brackets 4. Frame 3 supports the foam liquid tank 5, and a water supply tank 6, and carries, by suspension, a foam gauging tank 7. Within the space enclosed by frame 3 and supported on main frame 1, is mounted the foam whipping tank 8 and blower 9. At one end of frame 1 and mounted on bracket 4 is the rotary mixing tank 10, and at the opposite end of the main frame is driving motor 11. Motor 11 actuates drive shaft 12 by belt 13 and pulley 14. Shaft 12 is provided with clutches 15, 16 and 17 and timing gears 18.

Figure 3:
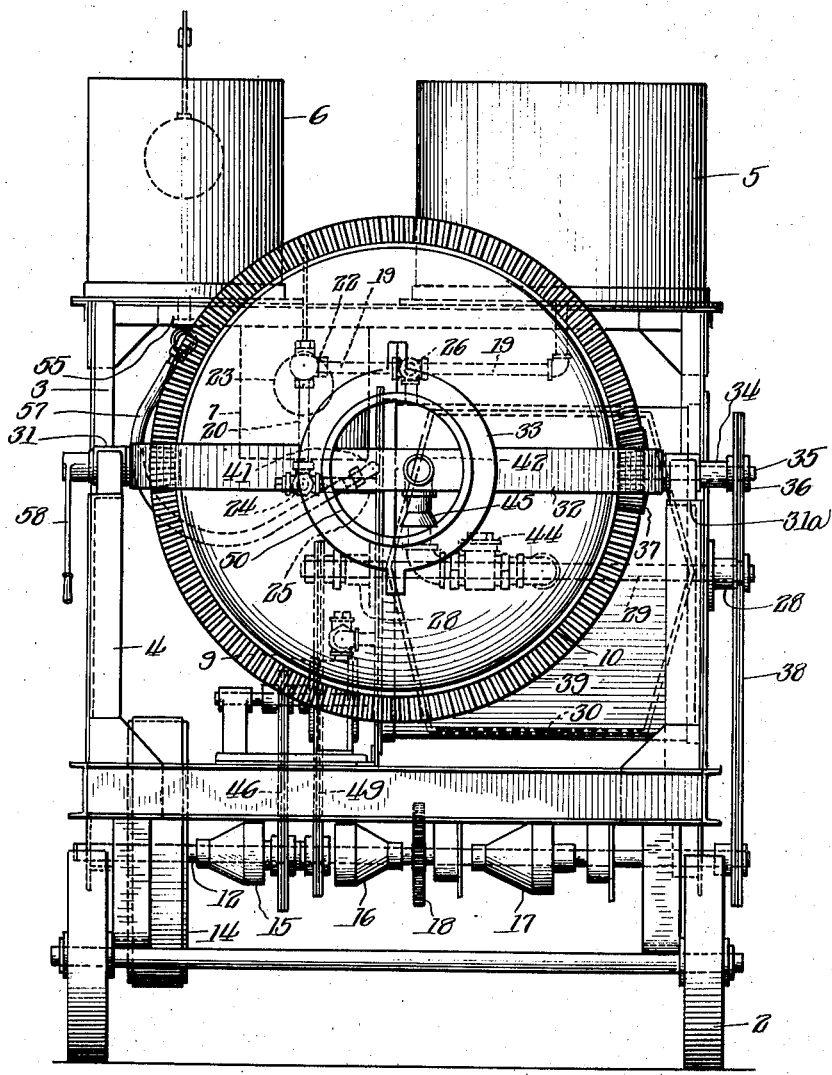
Fig. 3 is an end view of the same.

Gauging tank 7, is connected to foam liquid tank 5 by pipe sections 19, 20 and 21. At the junction of pipes 19 and 20 is located a float valve 22 operated by float 23 in gauging tank 7. At the junction of pipes 20 and 21 is a three-way valve 24 from which leads a pipe 25 to the foam whipper 8. An air pressure release valve 26 is mounted at the top of the foam whipper tank 8 and may be connected by any suitable link mechanism 27 with the three-way valve 24. Foam whipping tank 8 is provided with central bearings 28 which carry a rotary shaft 29, which shaft in turn is provided with a number of beating elements 30, as can be seen most readily in Figure 3.

Brackets 4, carry bearings 31 and 31—A, which in turn support frame 32, at the outer end of which are bearings 33, which provide a mounting for the rotary mixing chamber 10. Bearing 31—A supports hollow shaft 34 which in turn carries shaft 35, the latter having a pulley 36 secured at one end and a bevel gear 37 secured to the other end. Pulley 36 and shaft 35 are driven from main shaft 12 by a belt 38 through clutch 17. Mixing chamber 10 is rotatable by ring gear 39 which is integrally associated with it and which meshes with bevel gear 38. The inner hub 40 of mixing chamber 10 is hollow to admit the insertion of water pipe 41 and foam pipe 42. The discharge of foam from the whipper to the mixer is effected by pipe 43, valve 44 and cup joint 45 which connects with foam pipe 42. Foam is discharged from the whipper through the action of blower 9, which is piped to the whipper by pipe 47, having a quick opening valve 48 and connected to the side of the whipper tank 8. Blower 9 is actuated from shaft 12 by belt 46 and clutch 15. Whipper shaft 29 is actuated from main shaft 12 by belt 49 through clutch 16 and timing gears 18. Clutch 16 is arranged to be disengaged through the operation of timing gears 18 at a predetermined time interval. It will be understood that clutches 15, 16 and 17 can be operated by hand means, any suitable mechanism for doing this being satisfactory. Clutch 16, however, may also be disengaged by timing gears 18.

Mixer 10 may be of any commercial variety suitable for the purpose and will not be described further in detail. The plastic or cementitious material may be introduced at the open end 50, whereas, the foam, as before mentioned, and the water, are introduced at the opposite end 51. Water tank 6 is supplied and filled to a predetermined level from a source of supply through pipe 52 controlled by float valve 53, and three-way valve 54. The side opening of valve 54 connects through pipe 55 with the bottom of tank 6, and pipe 56 leads from valve 54 to the mixer 10, through a flexible connection 57. To facilitate the dumping of the contents of mixer 10, a hand lever 59 is provided and is secured to the shaft supporting frame 32.

For the most advantageous use of this invention, it has been found practicable to keep the proportions of the ingredients constant or nearly so for any given run. For this reason the foam gauging tank and the water tank have been provided with float control valves whereby the quantity of foam liquid and water can be kept at the predetermined points. The operation of this invention is essentially as follows:

A supply of water is maintained through pipe 52 and when valve 54 is opened from this pipe to tank 6, the latter is filled to the predetermined level. When this level has been reached, float valve 53 is automatically closed. Valve 54 is then turned a quarter turn to the right and this operation permits the water to flow from tank 6 into the mixing chamber 10 through pipe 56.

The aggregate materials comprising cement and finely divided sand are next introduced into the mixer 10 through opening 50 and these with the water are given a preliminary period of mixing. This mixing is effected through the rotation of mixer 10, operated by gear 37, belt 38 and clutch 17 on shaft 12.

Foam liquid tank 5 is supplied with a quantity of saponaceous material, the mixture consisting of rosin soap and glue having been found to be satisfactory. The proper setting of valve 24 will permit a quantiy of this foam liquid to be taken off through pipe 19, float valve 22 and pipes 20 and 21. This will permit gauging tank 7 to be filled to a predetermined level at which time valve 22 will be closed. Valve 24 is then turned a quarter turn to the left, in which position the supply from pipe 20 is shut off and the passage is opened between pipes 21 and 25. This operation of valve 24 through link 27, opens valve 26 to the atmosphere and permits the release of the air in the whipper tank 8 when the foam liquid enters said tank from pipe 25. During this charging operation, valves 48 and 44 are closed. After the foam liquid has run out from tank 7 to whipper 8, valves 24 and 26 are turned a quarter turn to the right which closes tank 8 to the atmosphere and opens the passage between tanks 5 and 7, and permits tank 7 to be filled again to the predetermined level by float valve 22. The whipper beating element is then actuated through the engagement of clutch 16, which changes the foam liquid into a light, strong foam. This whipping occupies a definite time period; for example, two minutes has been found satisfactory, at the end of which time clutch 16 is disengaged through the operation of timing gears 18. When the foam whipping is complete clutch 15 is engaged which starts the operation of blower 9, and valves 48 and 44 are open and the foam is thereby blown from the whipper tank 8 into the mixer 10. It is there mixed with the water, sand and cement which have been previously mixed, as before mentioned, with the result that a light, foamy, cellular concrete is produced.

While this latter mixing is taking place, another supply of foam liquid can be introduced into the whipper and the foam beating process again started. While the foam whipping process is being carried on the completed cementitious mixture can be dumped from the mixer 10 by the operation of handle 58 and a fresh supply of cement and sand can be introduced as before. To facilitate the dumping operation, the water connection to mixer 10 is made through a flexible hose 57, and the foam discharge connection to pipes 42 and 43 is effected by a cup joint 45, which breaks apart when the mixer 10 is dumped. While the mixing is taking place in mixer 10 a new supply of foam liquid can be introduced into the whipper and the whipping operation repeated. During the whipping operation, the mixing can be completed, the mixture dumped and a new supply of aggregate put in the mixer and the preliminary mixing operation started. It will thus be apparent that a simple, practical and efficient machine is provided for producing by a continuous process, a light, strong cellular cementitious product. The production of the concrete is thus seen to be continuous, a steady supply being produced, whereby any quantity of material is available for any size or quantity of work desired.

While a preferred form of this invention has been shown and described, it will be understood that changes and modifications may be made without departing from the spirit of the invention.

What we claim is:

1. In a machine of the class described, the combination of foam whipping means, mixing means in driving operative relation with said whipping means for mixing said foam with a cementitious material and means for blowing the foam from said whipping means to said mixing means.

2. In a machine of the class described, a foam whipper adapted to whip a foam solution into foam, a mixer for mixing foam with cementitious material, means for transferring foam from said whipper to said mixer, and power means operatively connected with and adapted to actuate said whipper and mixer simultaneously and independently.

3. In a machine of the class described, a whipper for producing foam, a rotary mixer in tilting, operative relation with said whipper and adapted to mix said foam with a cementitious material, means for transferring foam from said whipper to said mixer.

4. In a concrete machine, a whipper for producing foam, and a rotary mixer adapted to periodically tilt and make connection with said whipper to receive a charge of foam, said mixer being arranged to mix said foam with a cementitious material.

5. In a concrete machine, a whipper for producing foam, said whipper having a port, and a mixer for mixing said foam with a cementitious material, said mixer being arranged to periodically tilt into contact with said port to receive a charge of foam.

6. In a concrete machine, a foam whipper for whipping foam solution into foam, an air compressor, a mixer for mixing foam with a cementitious material, said mixer being detachably connected to said whipper, and power means common to and adapted to actuate said whipper, compressor and mixer.

7. In a concrete machine, the combination with a portable framework, of a whipper for producing foam, and a tilting mixer in tilting relation to said whipper, said whipper and mixer being supported by said framework so that said mixer alternately tilts into fluid receiving contact with said whipper and then into material discharging position.

8. In a concrete machine, a whipper for producing foam, a foam solution container arranged above said whipper and connected therewith by a pipe, means for introducing compressed air into said whipper, and an air release valve associated with said whipper to reduce the air pressure in said whipper to a point where fluid will flow from said container into said whipper.

HARRY E. BROOKBY.
FRED J. GOUGH.